(12) United States Patent
Braathen

(10) Patent No.: US 10,273,665 B2
(45) Date of Patent: Apr. 30, 2019

(54) CABINET AND A METHOD FOR PRODUCTION OF A CABINET

(71) Applicant: Thor Frölich Braathen, Eggedal (NO)

(72) Inventor: Thor Frölich Braathen, Eggedal (NO)

(*) Notice: Subject to any disclaimer, the term of this patent is extended or adjusted under 35 U.S.C. 154(b) by 0 days.

(21) Appl. No.: 15/570,198

(22) PCT Filed: Jun. 20, 2016

(86) PCT No.: PCT/NO2016/050132
§ 371 (c)(1),
(2) Date: Oct. 27, 2017

(87) PCT Pub. No.: WO2016/204628
PCT Pub. Date: Dec. 22, 2016

(65) Prior Publication Data
US 2018/0142451 A1  May 24, 2018

(30) Foreign Application Priority Data
Jun. 18, 2015 (NO) .................................. 20150811

(51) Int. Cl.
*E03B 7/09* (2006.01)
*F16L 5/10* (2006.01)

(52) U.S. Cl.
CPC ................ *E03B 7/095* (2013.01); *F16L 5/10* (2013.01)

(58) Field of Classification Search
CPC ............... E03B 7/095; F16L 5/10; E03C 1/02
See application file for complete search history.

(56) References Cited

U.S. PATENT DOCUMENTS

| | | | |
|---|---|---|---|
| 9,722,404 B2* | 8/2017 | Beele | H02G 3/22 |
| 2003/0178787 A1* | 9/2003 | Christie | F16J 15/025 |
| | | | 277/549 |
| 2008/0012326 A1* | 1/2008 | Braathen | F16L 19/0231 |
| | | | 285/354 |
| 2010/0059941 A1* | 3/2010 | Beele | F16L 5/10 |
| | | | 277/606 |
| 2011/0018210 A1* | 1/2011 | Beele | F16L 5/10 |
| | | | 277/606 |

(Continued)

FOREIGN PATENT DOCUMENTS

| | | |
|---|---|---|
| CH | 640290 A5 | 12/1983 |
| DE | 9410742 U1 | 10/1994 |

(Continued)

OTHER PUBLICATIONS

Frydenlund, Joachim, "International Search Report," prepared for PCT/NO2016/050132, dated Sep. 9, 2016, three pages.

*Primary Examiner* — Hanh V Tran
(74) *Attorney, Agent, or Firm* — Winstead PC

(57) ABSTRACT

A Cabinet for mounting of water pipe connections, where a number of water pipes (12, 13) are adapted to be fed into the cabinet, said cabinet comprises a body part (1) which is adapted to be mounted in a wall. The cabinet further comprises a base part (2) with through holes (10) for pipes (12, 13) whereas the openings (10) are arranged in sleeves that protrudes into the cabinet. The sleeves being configured to seal outwardly against the pipes (13). The base part comprises at least one drain (5) for leakage water, and the base part is a separate part with edges that protrudes into the cabinet.

7 Claims, 10 Drawing Sheets

(56) References Cited

U.S. PATENT DOCUMENTS

| | | | |
|---|---|---|---|
| 2012/0080849 A1* | 4/2012 | Zweigle | F16L 5/10 277/314 |
| 2013/0161913 A1* | 6/2013 | Beele | F16L 5/10 277/606 |
| 2013/0234404 A1* | 9/2013 | Coscarella | F16L 5/02 277/606 |
| 2013/0313787 A1* | 11/2013 | Fujiki | B60R 16/0222 277/606 |

FOREIGN PATENT DOCUMENTS

| | | |
|---|---|---|
| DE | 102010001089 A1 | 7/2011 |
| EP | 0596833 A1 | 5/1994 |
| JP | 2003202087 A | 7/2003 |
| NO | 314269 B1 | 2/2003 |

* cited by examiner

CABINET AND A METHOD FOR PRODUCTION OF A CABINET

The present invention relates to a cabinet of plastic material or metal as defined in the subsequent claim 1. The cabinet could be used to mount equipment which again are mounted to pipes or cables, in particular for distribution of warm or cold water in a building. The invention also relates to a method for manufacturing of a base part to the cabinet.

PRIOR ART

Publication DE 102010001089 A1 is a cabinet casted from foamed plastic and is therefore not watertight. It has no sealed passages for pipes for water with cover pipe on the outside and cannot lead any potential leak from the pipe to the drain. It has no mounting of pipe to the bottom.

CH 640 290 A5 relates to a cabinet according to present technique, made of steel with openings for passages for pipes and with separate sealing parts of rubber, for sealing around the metal pipes etc. The patent relates to valves etc.

DE 9410742 U1 is made of plates that are bent and drilled, and relates mainly to a cabinet with different depth and a possibility to mirror the valves, and also detached frames.

NO314 269 which corresponds to the patent application 20000037 shows a cabinet with holes for insertion of sealing parts made of rubber and double side walls in cabinets to seal the cabinet.

OBJECT OF THE INVENTION

The object of the invention is to design a cabinet that is easy to produce, with a few parts, but in a way that makes it possible to embed as much solutions as possible in the same operation. The cabinet could be produces by metal that is deep drawn, or vacuum shaped of for instance 4 mm ABS plastic plates, or it could be injection molded in plastic. Each cabinet shall be able to contain enough space to lead an individual pipe to each of the draining locations in the house, and with only one coupling outside of the cabinet for each pipe.

The cabinet shall prevent cold water to reach a temperature higher than 23° C., where the boundary for *legionella* bacteria is. The cabinet shall use materials that signals can go through, for sensors for solenoid valves etc. The cabinet shall not become rusty and cause water damages by condensate and tiny leakages. The cabinet shall give the user a cheaper product, but at the same time secure against water damages. It shall also give the installer a better and easier cabinet to mount.

The cabinet shall also give the caster of the floor a possibility to lead each pipe to the respective draining locations and the possibility to cast the respective pipe to exactly the right place. This gives the installer an easier job for subsequent entry of pipes in the cabinet. The cabinet shall also give the carpenter an opportunity for proper placement of the individual pipes, where they are lead through the wall from the second floor for easy mounting in the cabinet by the installer. The cabinet shall reduce the possibility for water damage at each draining location. The objective by the invention is to simplify the assembly and to give the builder a home without water damages in the future.

These and other objectives are achieved by a cabinet for mounting pipes for water connections in which a plurality of pipes for water are adapted to be inserted in the cabinet, said cabinet comprising a body part which is adapted to be mounted in a wall, characterized in that said cabinet further comprising a base part with though holes for pipes, said holes being arranged within sleeves extending into the cabinet, said sleeves being configured to seal outwardly against the pipe, said base part comprising at least one drain for leakage water, said base part is a separate part with edges projecting into the cabinet.

Preferably the sleeves are conical and having a sharp edge at its free end, said sharp edge is adapted to engage into a groove on an outer pipe of a pipe-in-pipe system.

As an additional precaution, an o-ring could be arranged between the pipe and the sleeve.

Preferably, the o-ring is disposed in a groove in a pipe-in-pipe system.

A simple assembly is achieved if the back wall of the cabinet is provided with fasteners that constitutes a half of a clamp for mounting of equipment in the cabinet, such as headers for water distribution.

To make it easy to put on a lid which provide good sealing properties against gush leakage, the cabinet has a recessed portion along three sides, said recessed portion is adapted to receive edges of the lid, said edges extending perpendicularly from the main plane of the lid, and that the lid has a further edge that is coplanar or parallel to the main plane of the lid, said further edge is adapted to be placed at the inside of the base part.

The cabinet is preferably made of plastic materials, which preferably is vacuum casted. This provides a non-corrosive, durable and light solution.

According to another aspect of the invention, the base part is produced by a mold equipped with a number of pins that defines beads on the base part and a plastic sheet is heated and then sucked into the mold. Thereby forming the beads projecting from the plastic sheet. The upwardly extending edges of the base part can be shaped simultaneously.

The top of the beads may suitably be milled or otherwise be cut off after the plastic is cold, to form sleeves with openings and a sharp edge at the free end of the sleeve. This sharp edge can hold an outer pipe in a pipe-in-pipe system by engaging a groove on the pipe.

FIGURES

FIG. 1 shows a sheet of metal which is deep drawn or a plastic sheet that is heated and vacuum shaped or injection molded in plastic.

FIG. 2 shows a sheet of corresponding materials as FIG. 1. Finalized in one operation.

FIG. 3 shows a cross section of pipe bushings.

FIG. 4 shows the assembled upper part of the cabinet.

Figure 5:
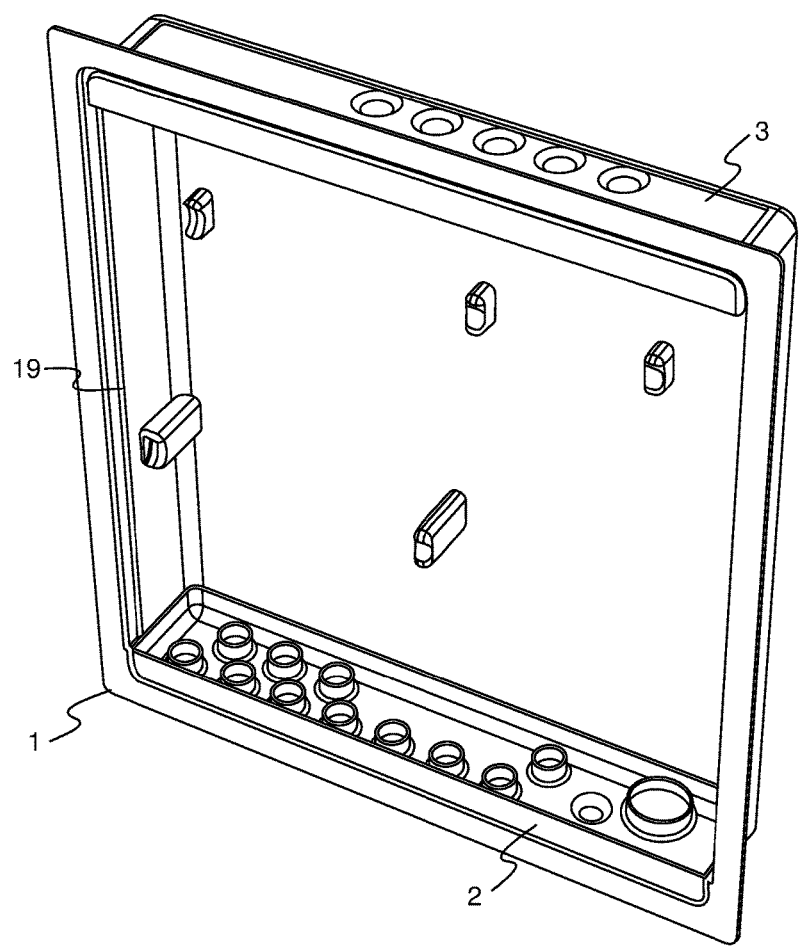

FIG. 5 shows the assembled cabinet by means of cabinet 1, base part 2 and upper part 3 glued together.

Figure 6:
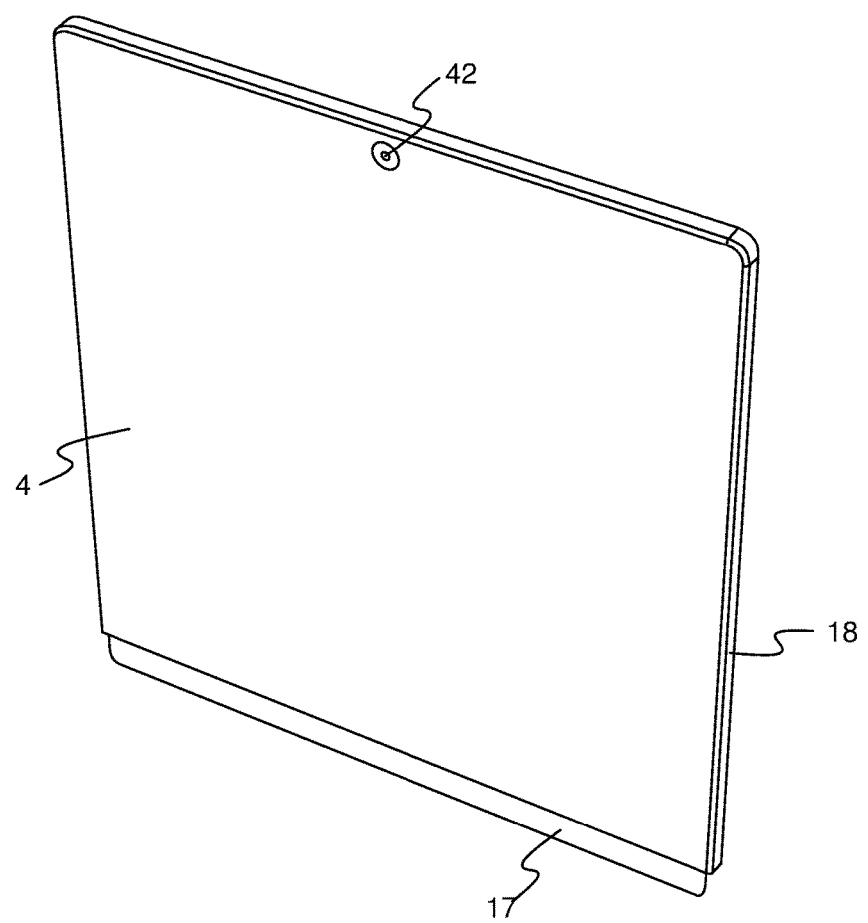

FIG. 6 shows the door made the same way as 1-2-3.

Figure 7:
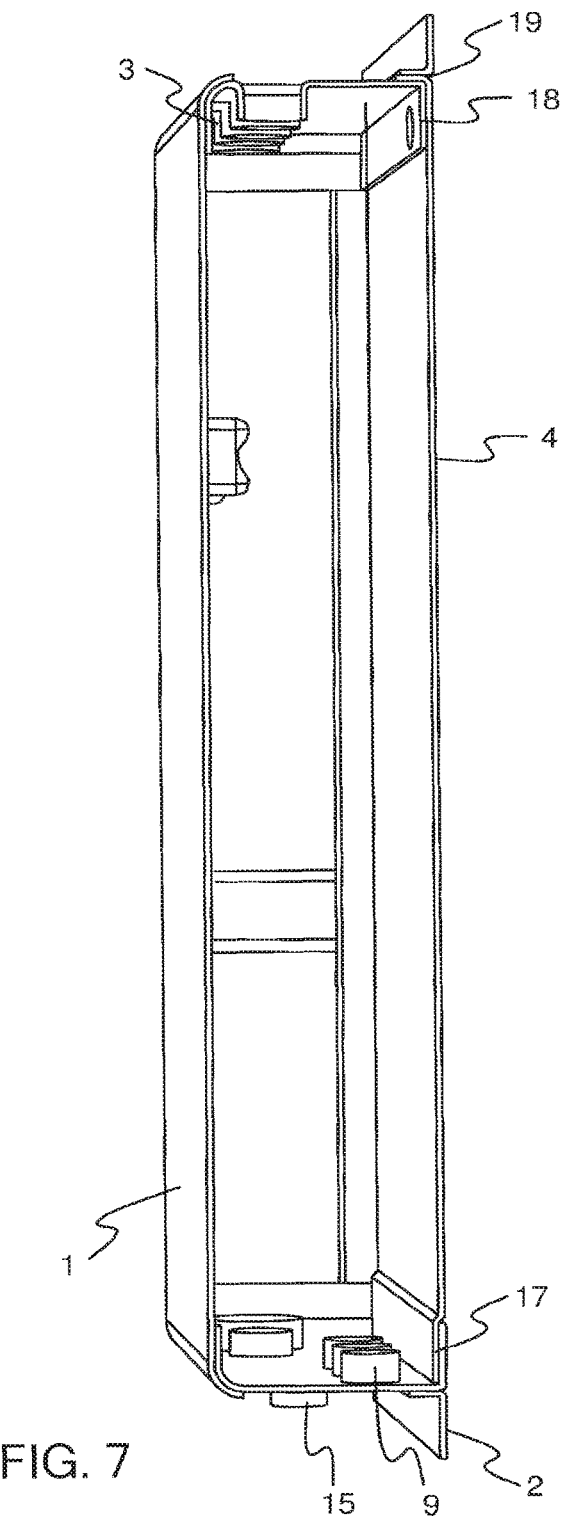

FIG. 7 shows a cross section of a glued cabinet made of the parts 1-2-3 and 4.

Figure 8:
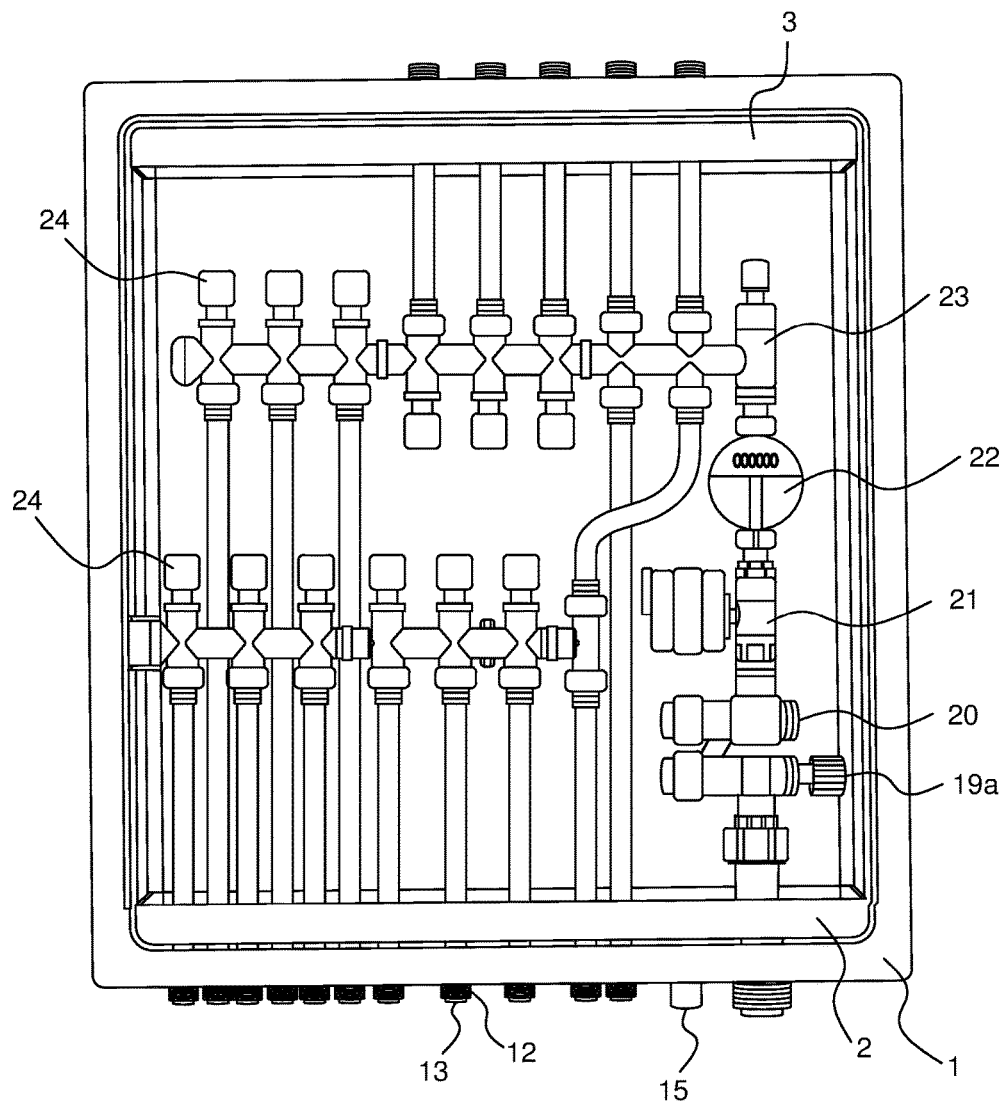

FIG. 8 shows an example of a cold-water cabinet with valves, headers, pipes etc.

Figure 9:
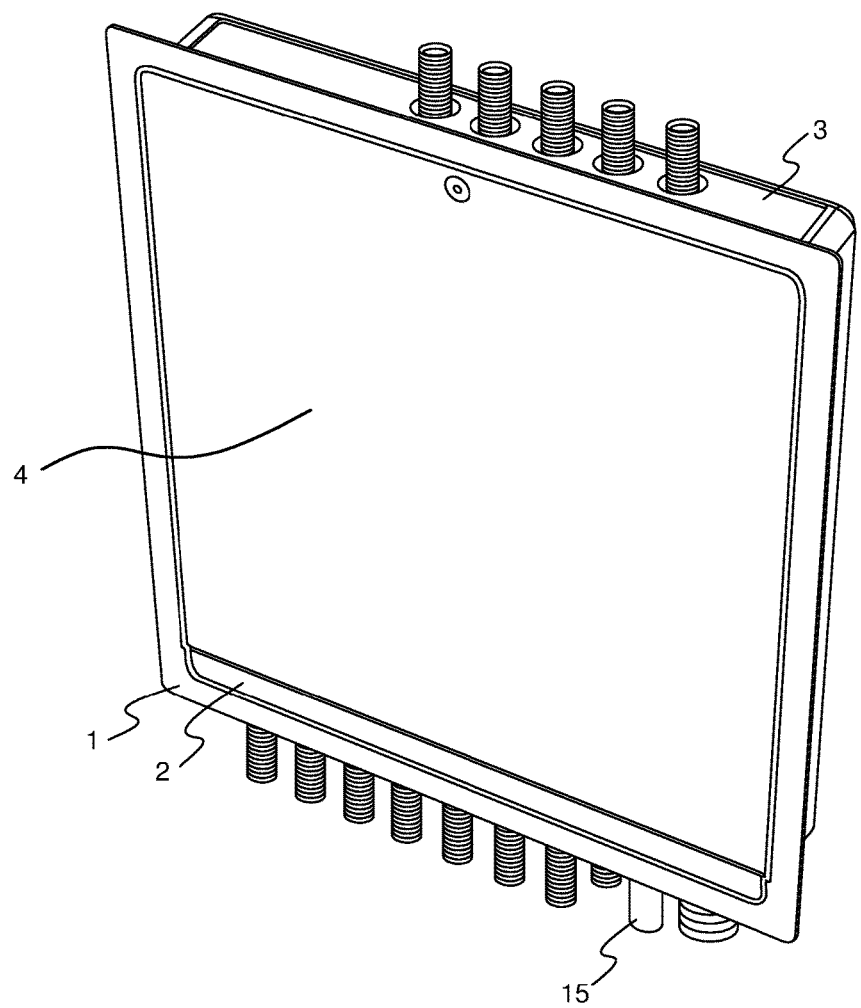

FIG. 9 shows a closed cabinet.

Figure 10:
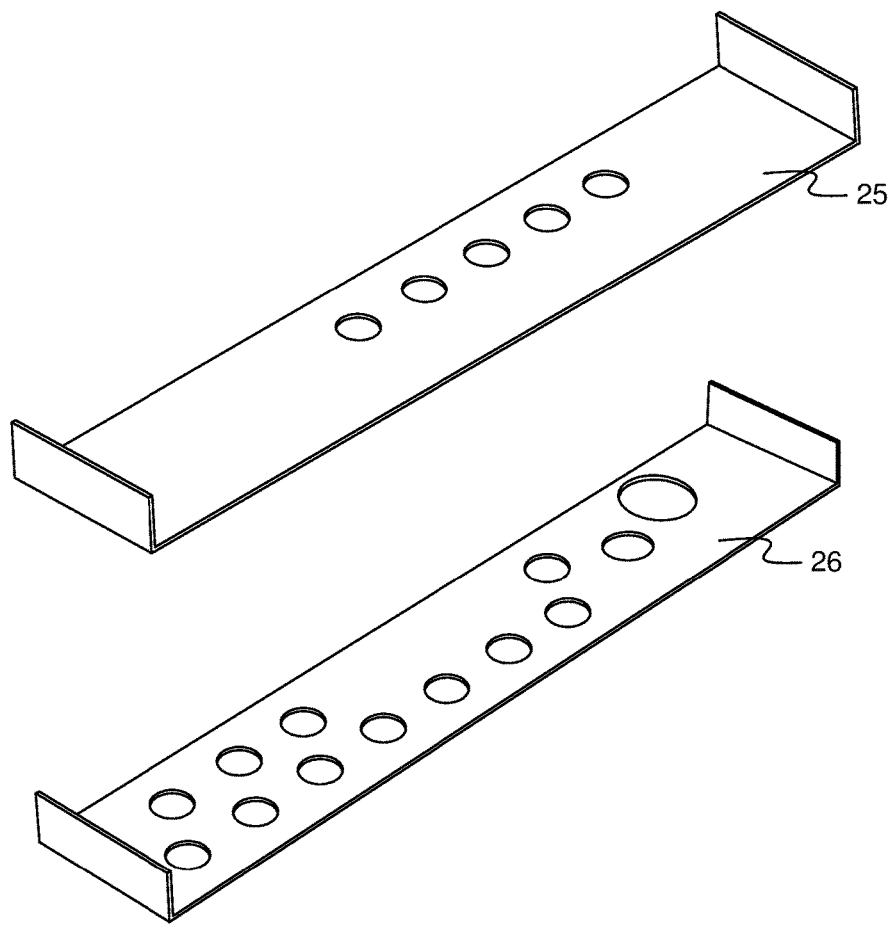

FIG. 10 shows templates to ease the work of an installer.

DETAILED DESCRIPTION OF AN EMBODIMENT OF THE INVENTION

Figure 1:
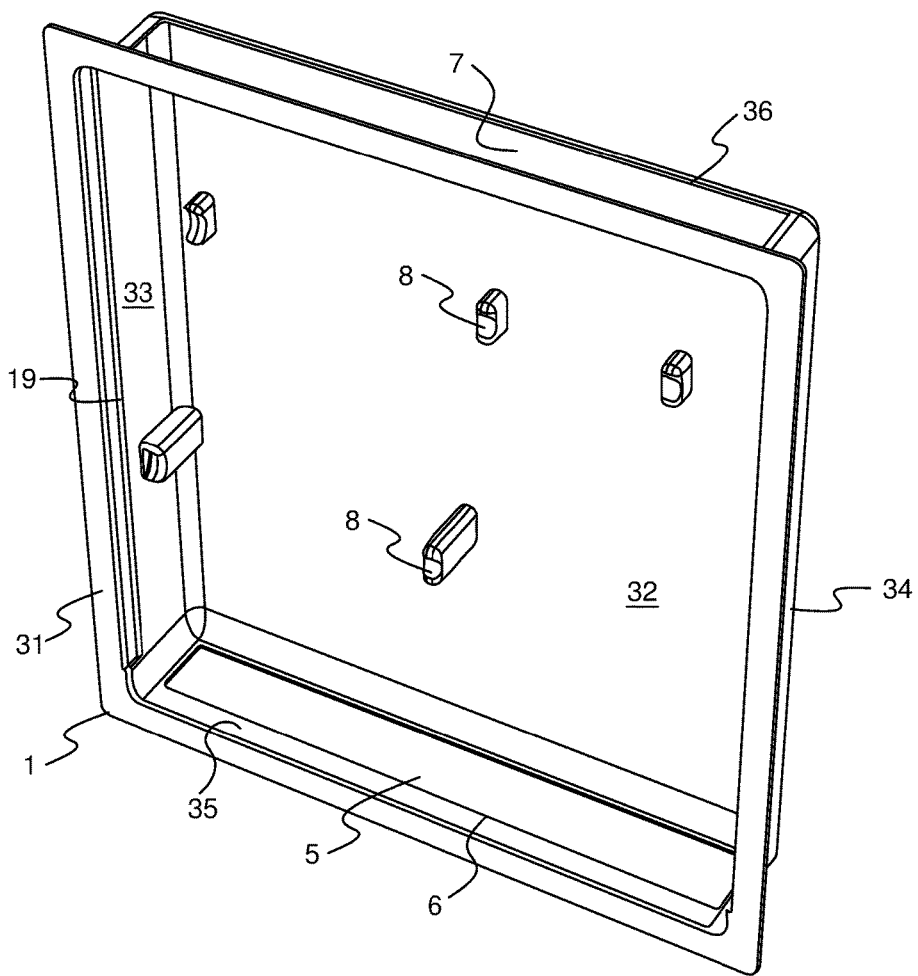
FIG. 1 to FIG. 7 are illustrating the manufacturing of a cabinet according to the invention step by step.

FIG. 1 shows the body 1 of a cabinet according to the invention.

The body comprises a frame 31 and a back wall 32. Sidewalls 33, 34, 35, 36 are extending between the frame 31 and the back wall 32. The back wall 32 has slightly smaller width and height than the outer dimensions of the frame 31.

There are arranged large openings 5, 7 in two of the sidewalls 35, 36.

This can be made of a metal plate that is deep drawn with for instance 1° C. slip in the mold so that the outer edges of the sheet creates a frame 31 which seals against the wall membrane or tiles (not shown).

The body part 1 is adapted to be placed in an opening in the wall having a larger width and height than the corresponding dimensions of the side walls 33, 34, 35, 36. The opening however, has smaller dimensions than the frame 31, so that the frame 31 covers the opening edge.

Figure 2:
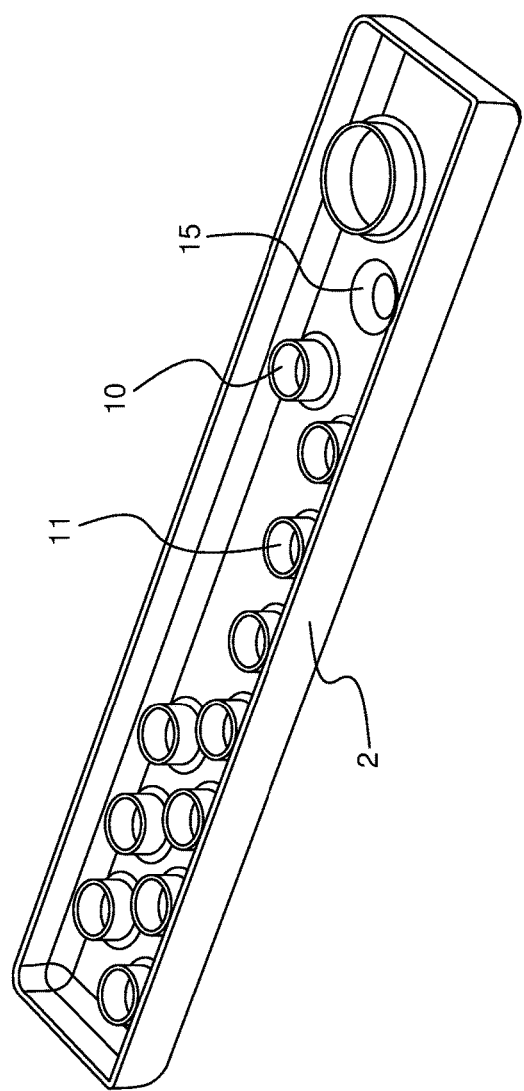
Figure 4:
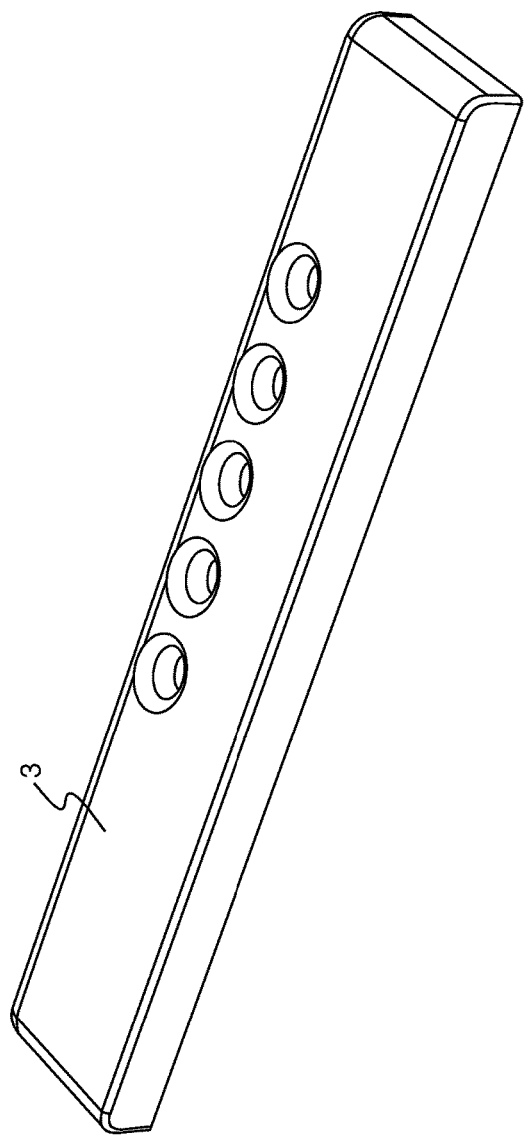

The cabinet takes up no space in the room as the cabinet protrudes into the wall. After a punching out the openings 5, 7, a circumscribing framing 6 around the openings 5, 7 remains. This framing 6 provides support and gluing of respectively a base part 2 and an upper part 3 (FIGS. 2 and 4).

The back wall 32 has protuberances 8 for correct placement and attachment of headers for the pipes for water and associated valves (see FIG. 8). The protuberances 8 creates one half of clamps needed for installation of the headers. In the shown example there is only four half of clamps needed for the assembly.

Just inside the frame 31 there is formed a slit 19 on three sides. The significance of this will be explained below.

The body part is preferably made in plastic by vacuum casting.

FIG. 2 shows a base part 2. This is shaped in a mold (not shown) having screwed conical pins. These pins can be exchanged to a requested diameter for fastening pipes 13 (see FIG. 3) with a requested diameter. The base part 2 can be vacuum pulled by sucking down a plastic plate and into a mold after heating and there are created sidewalls and conical beads 10. The top of the beads 10 are thereafter cut to obtain an opening and the correct internal diameter of the beads. The beads will thereafter have the shape of sleeves.

Figure 3:
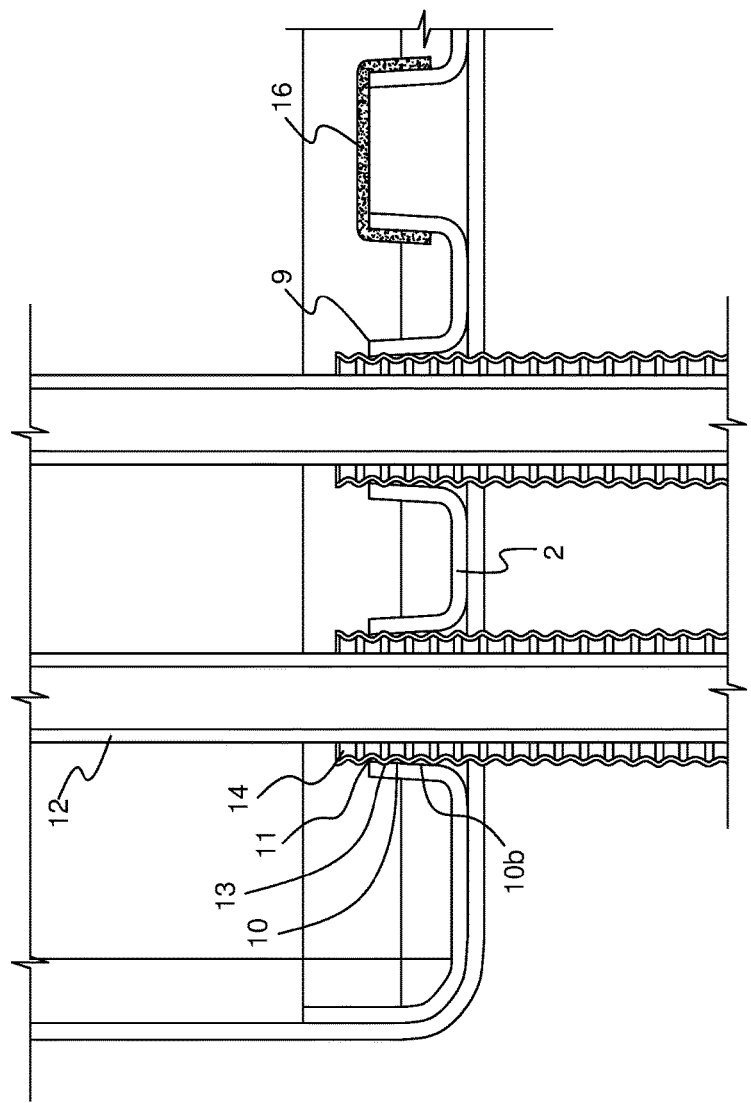

FIG. 3 shows a cross section through the base part 2 after this is mounted into the body part 1. The base part is preferably fastened by gluing, but it can also be fastened by welding, riveting or by screws.

After the beads 10 are cut down so that conical holes are created, these gets a sharp edge 11 at the top. This edge 11 receives and retains the outwardly grooved pipe 13 when this is pushed in from the outside of the cabinet. As a result of the sharp edge there is a tight seal between the edge 11 and the pipe 13. Any potential leak in the interior pipe 12 will thereby fill the pipe 13 in the space 14 between the interior pipe 12 and the outer pipe 13. The leakage water flows thereby into the cabinet and down to the base part 2.

It will further flow out through a drain 15, which is created by a bead that is extending opposite of the remaining beads 10. A pipe (not shown) can be connected to this bead to lead the water to a drain.

For further safety regarding the tightness between the outer pipe 13 and the bead 10, it is possible to arrange an O-ring in a groove on the pipe 13. This will seal against the conical hole in the bead 10.

A rubber hat 16 or other sealing element is utilized to seal the bead 10 if there are no pipes 12, 13 connected in this hole. The installer treads the pipe 13 through a conical hole in the bead 10 until it rises above the edge 11, cuts the pipe 13 a little distance above the edge 11 and thereafter leads the pipe 12 to a connection with the particular header in the cabinet and clamps in conventional ways a sleeve with a nipper. Dismantling is done by hand by unscrew the nuts from connection with the header and clench the pipe 12 and then pull out the pipe through the conical hole 10.

FIG. 4 shows the top part 3 which are going to be glued or in other ways fastened to the opening 7 in the upper part of the body part. The holes in the upper part 3 are shaped in a similar way as for the base part 2. The pipes that shall extend to the floor or floors above the cabinet are led into the cabinet in the same way.

FIG. 5 shows the cabinet 1 with a base part 2 and an upper part 3 glued together in the openings 5 and 7 in the body part 1. Both the base part 2 and the upper part 3 are shaped as a trough. As a result, the base part 3 that can collect leakage water to lead this to the outlet 15. The sidewall in the trough makes for both parts that there is a good surface to glue against the body part 1.

When the base part 2 and the upper part 3 are glued to the body part, this is ready to be mounted in the wall, and as soon as it is mounted in the wall, the headers and pipes are ready to be mounted in the wall.

FIG. 6 shows a loosely arranged cover 4 for the body part. The lid 4 has edges 18 on three sides. These are arranged perpendicular in relation to the extension of the lid. The fourth side facing down has an edge 17 extending in the same plane as the extension of the lid.

FIG. 7 shows the lid 4 which has been inserted with the edge 17 on the inside of the base part 2. The other three edges 18 of the lid are guided into the aperture 19 of the cabinet. The gush leakage at the inside of the cabinet will thereby be guided towards the base part 2. The lid 4 and the upper part 3 are locked together by means of for instance a screw (see FIG. 6)

FIG. 8 shows an assembled cold water cabinet with eleven outlets for pipes extending through the floor, to all pouring locations including water heaters and fire hose. The cabinet contains a main stop valve 19a with filter and with a built in pressure-reducing valve, for instance 3.5 bar.

There can be mounted a solenoid valve 21 through which sensors provides notification through signals, and closes the valve completely for all water when there is a leak. There can be arranged a leak sensor in the base part 2 (not shown) to stop the water and thus save large amounts of water from passing directly to the drain in the event of water leakage. It is further shown a water meter 22 that can be read via the mobile network by the waterworks.

A valve 23 is a stop cock/check valve that is preventing contaminated water from flowing back to the external network.

Each of the headers having three outlets for pipes and one stop cock 24 for each pipe outlet.

In the event of a water leak on a tap point, the stopcock 24 can be closed for this pipe, while the other outlet works as before. This minimizes the loss of water until the installer comes to fix the leakage.

FIG. 9 shows a complete cabinet for wall installation. With the cabinet according to the present invention there could be a dedicated cabinet for cold water that provides space for one pipe per pouring location and as a result of that the cold water pipes are not heated by the hot water pipes in the same cabinet, the cold water will normally be kept below 23° C. This prevents growth of *legionella* and other bacterias.

It is further possible to have a similar cabinet for hot water with one pipe per pouring location and with a sensor for water leakage in the hot water cabinet in addition to outlet 15 towards drain to prevent water damage.

FIG. 10 shows a complete template 25 for a carpenter/installer for mounting between pillars in the wall c/c 600 mm. Thus, each tube passing through the hole has correct position for later assembly of cabinets. The template 25 is placed approximately 500 mm above the future top of the cabinet. The template 26 is used by the caster/installer in order to attach the template at exactly the right place between two future pillars for a division wall c/c 600 mm.

This simple solution saves the mason/installer in eight out of ten cases from having to break up floors to get the pipes into the cabinet. There is a huge chance for holes in the outer tube 13 and the whole point with leading leakage to drain is vanished if the floor pipes must be broken up to get the right placement.

The invention claimed is:

1. A cabinet comprising:
    a body part adapted to be mounted in a wall;
    an outer pipe surrounding a length of an inner pipe, a space open to the interior of the cabinet being formed between the outer pipe and the surrounded length of the inner pipe; and
    a base part coupled to the body part and comprising:
        an integral conical sleeve, the integral conical sleeve having formed therein a through hole and comprising a sharp edge at a free end of the integral conical sleeve, the sharp edge sealingly engaging a groove of the outer pipe; and
        wherein the integral conical sleeve protrudes into the cabinet; and
        a drain for leakage water.

2. The cabinet according to claim 1, wherein an o-ring is arranged between the outer pipe and the integral conical sleeve.

3. The cabinet according to claim 2, wherein the o-ring is disposed in a groove on the outer pipe.

4. The cabinet according to claim 1, wherein a back wall of the cabinet is provided with fasteners that constitute half of a clamp for mounting of equipment in the cabinet.

5. The cabinet according to claim 4, wherein the equipment comprises a header for water distribution.

6. The cabinet according to claim 3, wherein the groove in which the o-ring is disposed is the same groove as the groove sealingly engaged by the sharp edge of the sleeve.

7. The cabinet according to claim 1, wherein the drain is coupled to an external drain outside the cabinet.

* * * * *